United States Patent [19]
Novoa et al.

[11] Patent Number: 5,984,404
[45] Date of Patent: Nov. 16, 1999

[54] VEHICLE WITH BED RAISING AND LOWERING SYSTEM

[75] Inventors: Luis A. Novoa, Portland; Ferdinand F. Hellhake, Beaverton; Mark S. Hurayt, Aloha; Byron J. Bocian, Portland, all of Oreg.; Charles Huffman Blakewood, Jr., Vancouver, Wash.; Duncan Good, Portland, Oreg.

[73] Assignee: Freightliner Corporation, Portland, Oreg.

[21] Appl. No.: 08/805,458

[22] Filed: Feb. 25, 1997

[51] Int. Cl.⁶ ........................................................ B60J 7/00
[52] U.S. Cl. ................................ 296/190.02; 296/190.01; 296/24.1
[58] Field of Search .................... 296/190.02, 190.01, 296/24.1; 5/118, 10.1, 10.2; 105/314, 315, 316, 317, 318

[56] References Cited

U.S. PATENT DOCUMENTS

| | | | |
|---|---|---|---|
| 22,025 | 11/1858 | Lawrence | 105/317 |
| 534,756 | 2/1895 | Pearson | 105/318 |
| 544,547 | 8/1895 | Pearson | 105/318 |
| 593,445 | 11/1897 | Toal et al. | 105/317 |
| 867,409 | 10/1907 | Poor | 105/318 |
| 931,962 | 8/1909 | Roundtree | 105/317 |
| 1,197,035 | 9/1916 | Knudtson et al. | 5/10.2 |
| 1,417,719 | 5/1922 | Covington | 105/318 |
| 2,673,353 | 3/1954 | Dean et al. | 105/318 |
| 2,968,048 | 1/1961 | Roberge | 105/318 |
| 4,058,860 | 11/1977 | Daidone | 5/10.1 |
| 4,141,093 | 2/1979 | Marsden | 5/118 |
| 4,351,554 | 9/1982 | Miller | 296/24.1 |
| 5,031,563 | 7/1991 | Matre | 296/190.02 |
| 5,201,379 | 4/1993 | Penzotti et al. | 296/190.02 |
| 5,560,673 | 10/1996 | Angelo | 296/190.02 |
| 5,638,560 | 6/1997 | Rigdon et al. | 296/190.02 |

FOREIGN PATENT DOCUMENTS

| | | | |
|---|---|---|---|
| 505058 | 8/1954 | Canada | 105/317 |
| 1127972 | 6/1955 | France | 5/118 |

*Primary Examiner*—Joseph D. Pape
*Assistant Examiner*—Kiran Patel
*Attorney, Agent, or Firm*—Klarquist Sparkman Campbell Leigh & Whinston, LLP

[57] ABSTRACT

A vehicle such as a truck with a sleeping compartment includes a bed positioned within the sleeping compartment and most preferably at an upper berth position. A bed shifter is provided for shifting the bed between bed sleeping and bed storage positions. More specifically, the upper bed sleeping surface of the bed is raised toward the ceiling of the vehicle when the bed is shifted between the sleeping and storage positions, with the side portions of the bed similarly being raised as this shifting occurs. The bed shifter may be designed to tilt the bed as shifting occurs so that, when in the bed storage position, the upper bed surface more closely follows the contour of a vehicle with a downwardly sloped or otherwise configured ceiling. Bed shifting elements of variable length may be provided to shift the bed by varying the length of these elements. In one form, the elements comprise elongated straps which are wound and unwound from a rotatable shaft to raise and lower the bed between bed sleeping and bed storage positions. Guide tracks may be provided to guide the motion of the bed as it is shifted between such positions. Manual as well as motor powered bed shifting systems may be used.

32 Claims, 12 Drawing Sheets

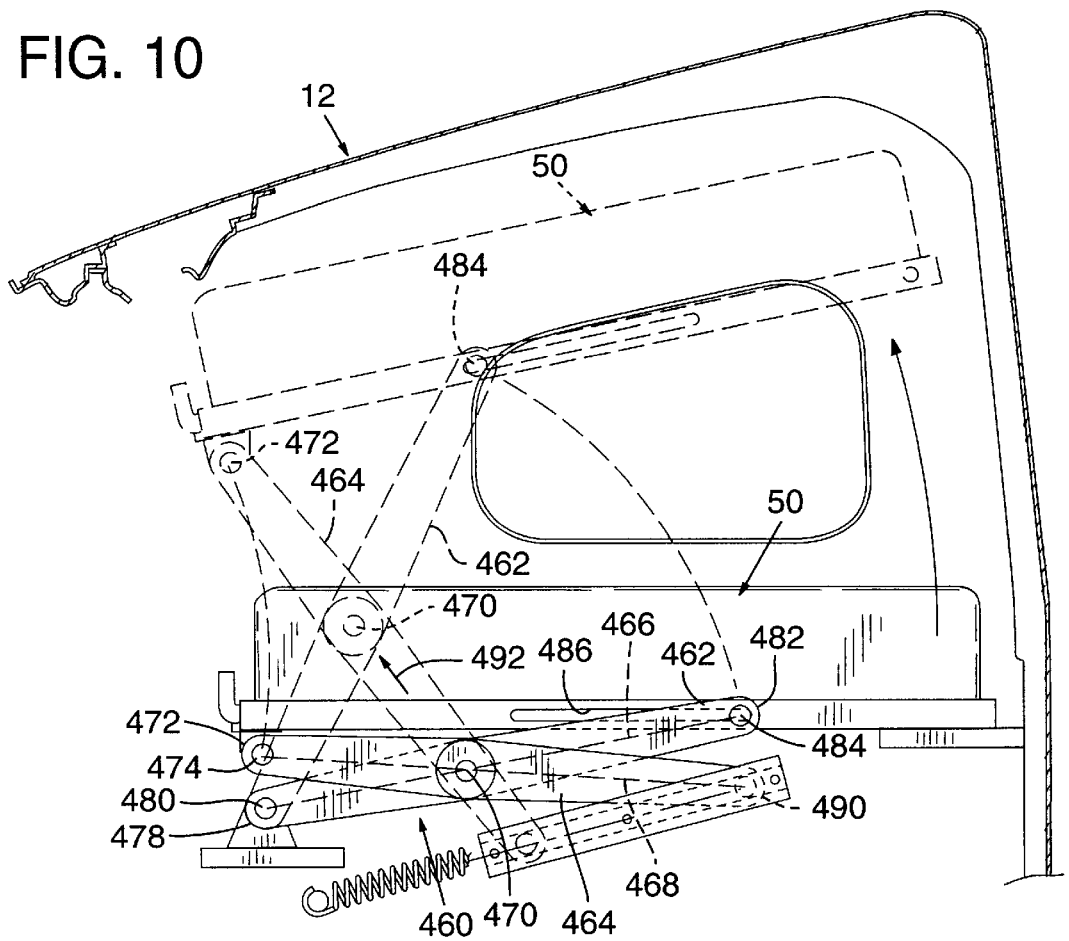

VEHICLE WITH BED RAISING AND LOWERING SYSTEM

BACKGROUND OF THE INVENTION

The present invention relates to trucks or other land vehicles with sleeping compartments and, more specifically, to land vehicles with beds supported in such compartments in a manner that permits the beds to be stowed to free up space otherwise occupied by the bed.

It is known for vehicles, such as long-haul trucks, to include sleeping compartments rearwardly of the driver and passenger seat area of the truck.

A number of these sleeping compartments are of a raised roof configuration which provides sufficient head clearance, that is, space between the floor and interior ceiling, to allow a driver or a passenger of the truck to stand fully erect in the sleeping compartment area. Beds positioned in the sleeping compartment are known to have been hinged to a lower portion of the back wall of the truck for pivoting about a fixed pivot axis which extends perpendicularly to the longitudinal axis of the truck. In some cases, storage compartments have been positioned under such beds so that when the beds are pivoted, access is provided to the storage spaces. In such configurations, the bed and storage compartment interferes with the area available for an individual to walk in the sleeping compartment. That is, the bed occupies floor space that would otherwise be available for someone to walk within the sleeping area.

Truck sleeping compartment configurations are also known where the bed is pivoted to a lower portion of the back wall so that it can be shifted against the back wall of a truck in a "murphy" bed style configuration. When against the back walls additional floor space is available in which a person can walk within the sleeping compartment. However, the bed still occupies space in a lower portion of the sleeping compartment, even when folded against the back wall. In addition, when the bed is lowered, no living space is available under the bed.

Sleeping compartment bunk configurations for trucks are also known where an upper and lower bunk are provided with both of the bunks or beds extending transverse to the longitudinal axis of the vehicle. In these arrangements, the upper bunk prevents an individual from walking erect in the sleeping compartment area of the vehicle. In addition, the lower bunk limits space available for walking and other furnishings. In addition, the upper bed or bunk in such configurations interferes with the folding of the lower bunk against the back wall of the vehicle.

Therefore, a need exists for vehicles with beds which are constructed in a manner that frees up additional space within a vehicle for other purposes and, in particular, which is directed toward overcoming these and other problems of the prior art.

SUMMARY OF THE INVENTION

In accordance with the present invention, a land vehicle such as a truck has a cab with a sleeping compartment. The sleeping compartment is defined by first and second side walls, a rear wall, a ceiling and a floor. In a truck with a raised roof configuration, the ceiling of the sleeping compartment typically slopes forwardly from the rear wall and toward the front of the truck. In raised roof configuration trucks, there is typically enough headroom between the ceiling and floor to allow an individual to walk fully erect throughout the majority of the sleeping compartment.

At least one bed is positioned in the sleeping compartment. The bed has an upper major sleeping surface, an opposed major under surface, and side edge portions extending between the sleeping surface and under surface. A bed shifting system couples the bed to the cab and is operable to shift the bed from at least one sleeping position in which the bed sleeping surface is spaced from the ceiling a sufficient distance to permit a user to climb onto the bed sleeping surface and recline thereon to a bed storage position. When shifted to the bed storage position, the bed sleeping surface and side edge portions of the bed are shifted upwardly toward the ceiling of the sleeping compartment to position the bed sleeping surface adjacent to the ceiling. As a result, additional clearance is provided between the bed under surface and the floor when the bed is in the bed storage position. In a raised roof configured truck, in a preferred embodiment the bed is raised sufficiently to allow an individual to walk underneath the bed without having to duck. In a particularly preferred embodiment, the bed sleeping surface is not only adjacent to the ceiling, but abuts the ceiling, with the mattress or other bed covering materials being pressed against the ceiling when the bed is stored. Although variable, the higher the bed is raised toward the ceiling, the greater the clearance between the bed under surface and vehicle floor.

The bed shifting system may be built into a bed with the truck then simply incorporating attachment mechanisms for coupling to the bed contained shifting system. Alternatively, the bed shifting system may be substantially separate from the bed and built into the truck, for example, at the time the truck is manufactured.

In accordance with one specific form of the invention, the bed shifting system may comprise at least one and preferably more supports of selectively variable length which are coupled to the bed. In this approach, by adjusting the length of the supports, the bed is shifted between the sleeping and bed storage positions. These elongated bed supports may take various forms, such as fluid cylinders and screw jacks. Alternatively, the elongated bed supports may comprise a plurality of flexible elements which suspend the bed downwardly below the ceiling as the bed is shifted between bed sleeping and bed storage positions. These flexible elements may comprise cables, chains, belts or the like but, in a specifically preferred form, such elements comprise a plurality of flexible straps.

In a specific bed shifting system of the invention, the mechanism includes a rotatable shaft coupled to the flexible elements. In addition, a motor is coupled to the shaft for rotating the shaft. When the shaft is wound in a first direction, the flexible elements are wound about the shaft to raise the bed. In contrast, when the motor rotates the shaft in a second direction opposite to the first direction, the flexible elements are unwound from the shaft to lower the bed.

In accordance with another aspect of the present invention, a first set of flexible elements may be coupled to the bed adjacent to a rear wall of the sleeping compartment. In addition, a second set of flexible elements may be coupled to the bed at a location spaced further away from the rear wall, such as toward the front of the bed. The first or rearmost set of flexible elements are coupled to the shaft so as to be wound and unwound from the shaft at a faster rate than the second set of flexible elements. Consequently, the rear portion of the bed travels faster and a further distance as the bed is raised and lowered compared to the front of the bed. As a result, the bed sleeping surface tilts forwardly from horizontal as the bed is raised and tilts rearwardly toward horizontal as the bed is lowered toward the bed sleeping position. Consequently, with a ceiling that slopes downwardly moving from the rear toward the front of the truck, the bed sleeping surface tilts at a similar orientation to allow it to more closely follow the contour of the ceiling of the truck as the bed is moved toward a bed storage position.

As yet another aspect of the present invention, the flexible elements may be substantially enclosed by the ceiling and rear wall of the sleeping compartment, at least when the bed is in the bed storage position. Alternatively, such elements may be substantially enclosed by the bed, itself, when the bed is in the bed storage position.

Bed position sensors may be coupled to the motor with the motor being responsive to such sensors to stop operating when the bed is sensed by the sensors to be in preselected positions. In a specific form, such sensors may comprise limit switches activated by the bed when the bed is in respective bed storage and bed sleeping positions to stop the motor when the bed is shifted to the desired position. Timers and other mechanisms may also be used to selectively stop the motor, for example, if the motor is activated to shift the bed from a bed sleeping position to a bed storage position and the bed is not sensed to be in the bed storage position within a predetermined time. In addition, optional obstacle sensors (e.g. pressure sensors, and/or motor load sensors such as of the type utilized in garage door systems) may be used to cause the motor to reverse the direction of rotation of the shaft to lower the bed upon the detection of an obstacle as the bed is being raised.

In accordance with another specific embodiment of the present invention, the bed shifter may comprise a scissors structure coupling the bed to the cab.

As still another aspect of the present invention, at least one and, most preferably, first and second parallel spaced-apart upright elongated bed motion guiding tracks are mounted to the rear wall of the truck and are coupled to the bed so as to guide the motion of the bed as it shifts between bed sleeping and bed storage positions. In addition, a guide such as a roller is mounted to the bed and positioned to engage and follow the track to guide the motion of the bed as it is shifted between bed storage and bed sleeping positions.

In designing the truck cab, the ceiling of the sleeping compartment may be provided with a recess to receive the bed sleeping surface and, more specifically, the upper portions of the bed when the bed is moved to the bed storage position. This recess may be deep enough to completely receive the bed so that the ceiling has a generally flush appearance when the bed is in the bed storage position, with the under surface of the bed, in effect, forming an exposed portion of the sleeping compartment ceiling.

One or more fluid struts may optionally be employed in the bed shifting system to limit the rate of movement of the bed between bed storage and bed sleeping positions. For example, in a manual system, such fluid struts would assist in lowering the bed at a controlled rate as the bed shifter is operated.

The cab may also include bed supports projecting inwardly into the sleeping compartment from the walls of the truck cab, for example, from the side walls and/or from the rear wall, to engage and support the underside of the bed when the bed is in a bed sleeping position. Consequently, the bed shifting mechanism need not support the bed and the weight of a person reclining thereon when the bed is in use. These bed supports may include a shelf with an interior storage cabinet positioned below the shaft and mounted or otherwise coupled to the shelf.

In a specifically preferred embodiment of the present invention of a raised roof sleeping compartment configuration with an inclined ceiling, when the bed is in a bed storage position there is at least about 200 cm. of head height between the under surface of the bed at the front portion of the bed and the floor (measured without any carpet being positioned on the floor) and about 230 cm. of clearance between the floor and back edge of the bed. In addition, when the bed is in the bed sleeping position, in this embodiment at least about 150 cm. of clearance is provided between the bed under surface and the floor. This allows sufficient headroom for an individual to comfortably sit in a standard chair underneath the bed, even when the bed is in the bed sleeping position. Consequently, one person may sleep in the bed while another person does paperwork or otherwise occupies the space under the bed.

The invention also relates to methods of raising a bed in a sleeping compartment.

These and other features, objects and advantages of the present invention will become more apparent with respect to the following description and drawings.

BRIEF DESCRIPTION OF THE DRAWINGS

FIG. 10 is an embodiment of the present invention utilizing a scissors structure for raising and lowering the bed.

DETAILED DESCRIPTION OF PREFERRED EMBODIMENTS

Figure 1:
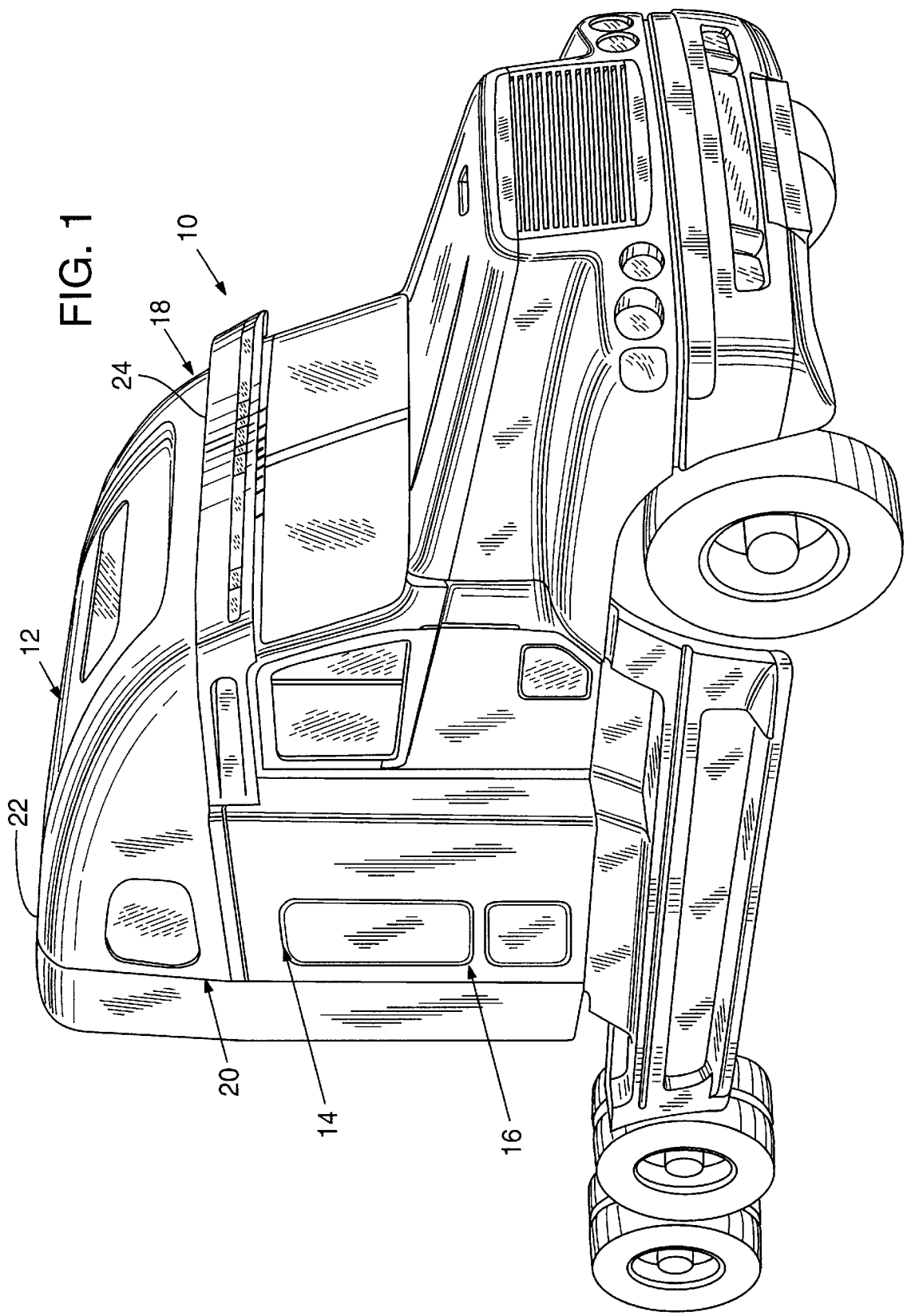
FIG. 1 is a perspective view of one form of a truck with a raised roof configuration.

With reference to FIG. 1, a truck 10 is shown of the type which has a raised roof 12. A rear portion 14 of the truck 10 comprises a sleeping compartment or living space area. The sleeping compartment is positioned rearwardly of the driver and passenger seats of the vehicle and is contained within first and second side walls 16, 18 of the truck, a rear wall 20 of the truck, and the roof 12. As can be seen in FIG. 1, for aerodynamic reasons, the roof 12 typically slopes downwardly moving from a rear portion of the roof 22 toward a front portion of the roof 24. In general, the interior walls of the sleeping compartment follows the contours of the exterior side walls, rear wall and roof of the truck. It should be understood that although this invention is described with reference to a truck of a raised roof configuration in accordance with a most preferred embodiment of the invention, it should be noted that the invention is applicable to vehicles of other configurations, such as to trucks with flat roofs and to trucks which are not of a raised roof configuration.

Figure 2:
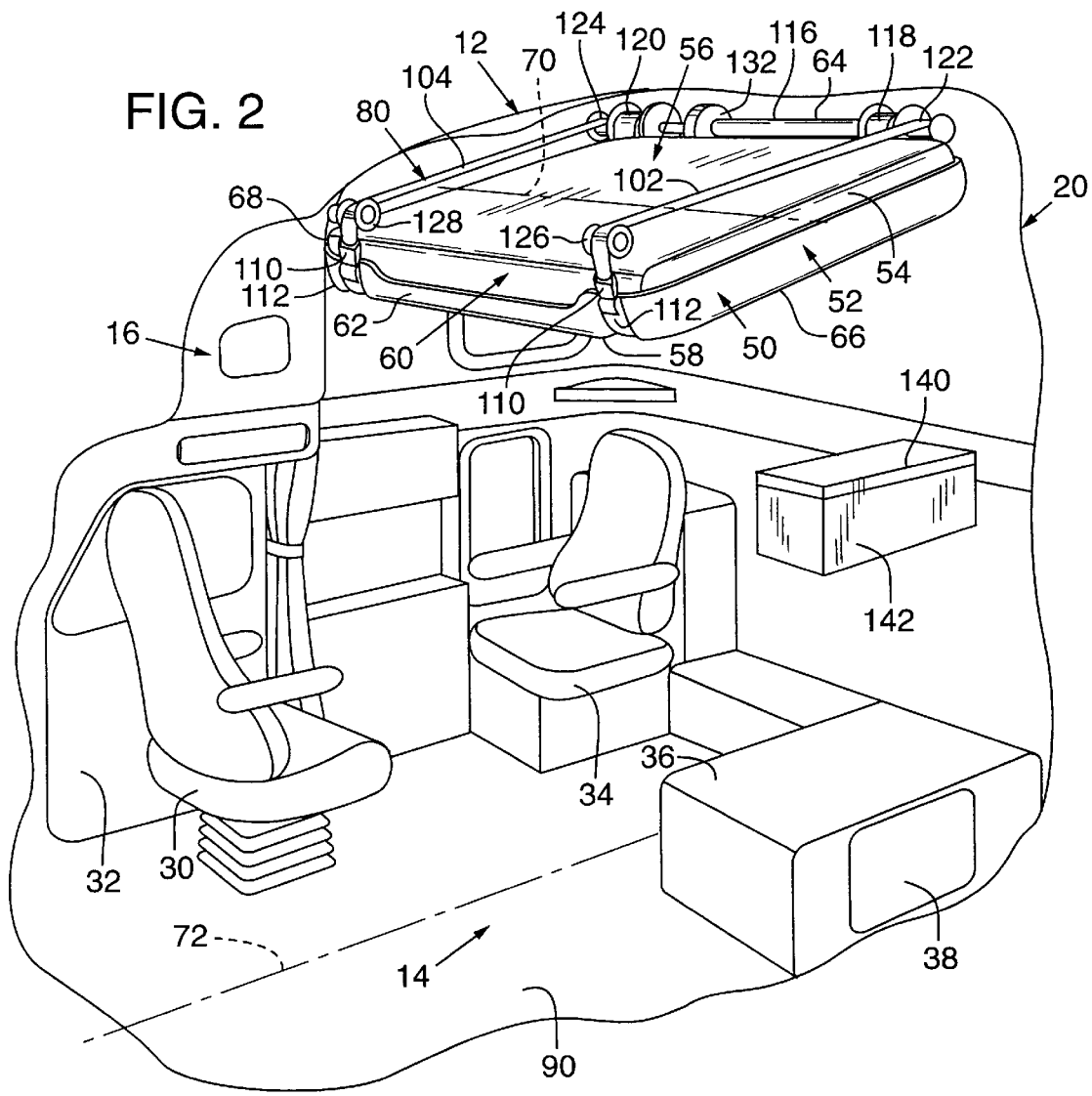
FIG. 2 is a schematic illustration of a sleeping compartment of a truck of FIG. 1 with a bed shown shifted upwardly within the sleeping compartment to a bed storage position adjacent to the ceiling of the truck.
Figure 3:
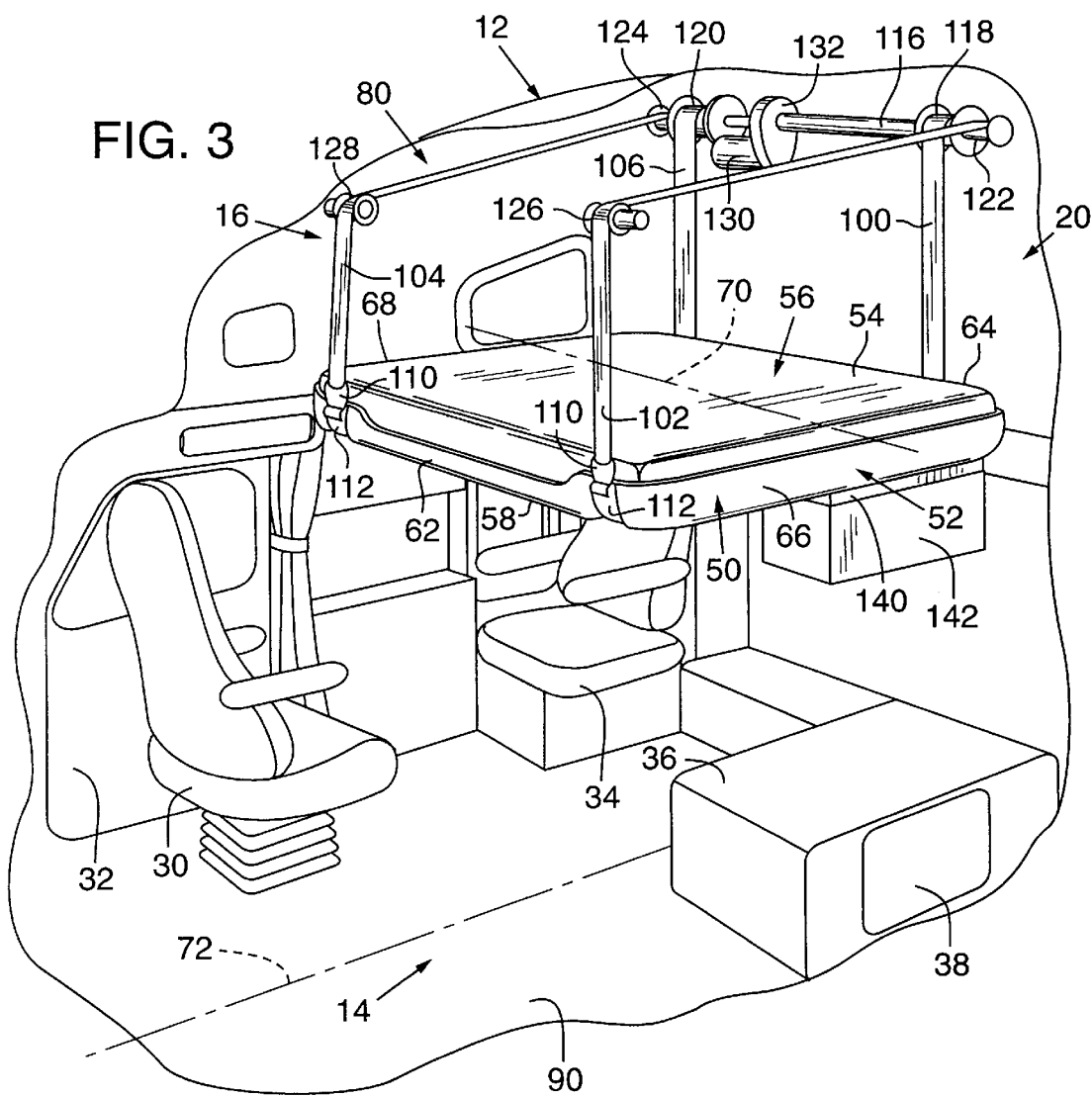
FIG. 3 is a schematic illustration of the sleeping compartment of the truck of FIG. 2 with the bed shown in a bed sleeping position.

Referring to FIGS. 2 and 3, a schematic illustration showing one form of sleeping compartment 14 is illustrated for a vehicle of the type shown in FIG. 1. The sleeping compartment may include furnishings and other features which are different from those shown in these figures. However, for purposes of convenience, FIGS. 2 and 3 illustrate a passenger seat 30 adjacent to the passenger door 32. The seat 30 is shown pivoted from a forward facing position to a position facing the interior of the living or sleeping compartment area of the vehicle. Another chair 34 is shown in a rear portion of the sleeping compartment along with a bench or cabinet support 36 within which storage areas may be provided. Access to these storage areas may be provided, for example, by lifting up the lid of the bench 36 or through a doorway 38 extending through the side wall of the truck.

In FIG. 2, a bed 50 is shown in a raised or bed storage position adjacent to the ceiling of the vehicle underneath the roof 12. The bed 50 includes a bed frame 52 and a mattress 54. The mattress may be a commercially available truck mattress. Alternatively, the mattress may be of a quilted fireproof fabric such as MBSS 302 fabric from Tietex Corp. of Spartanburg, N.C. In this latter case, as a specific example, the mattress may be 7½ inches thick by 75 inches long by 50 inches wide. In other words, the mattress may be a full sized mattress. The illustrated bed 50 includes a bed sleeping surface 56 and a bed under surface 58 with side portions 60 extending between the bed under surface and bed sleeping surface. The illustrated bed is of a generally rectangular configuration having a front side edge portion 62, a rear side edge portion 64, and first and second end portions 66, 68. Although other orientations may be used, the illustrated bed extends transversely within the sleeping compartment of the truck. That is, the bed has a longitudinal axis along a line 70 which is perpendicular to the longitudinal axis 72 of the truck.

The bed assembly shown in FIGS. 2 and 3 includes a bed shifter or shifting system, illustrated in one form at 80, which couples the bed to the cab of the truck. The bed shifter is operable to shift the bed 50 from at least one sleeping position, such as shown in FIG. 3, to a bed storage position, such as shown in FIG. 2. When the bed is in a bed sleeping position, the bed sleeping surface 56 is spaced from the ceiling of the truck a sufficient distance to permit a user to recline on the bed sleeping surface As shown in FIG. 3, although the bed may be, for example, located at lower or higher positions than shown when in a bed sleeping position, the illustrated location depicts the bed in an upper berth position. That is, when in this bed sleeping position, there is enough clearance between the floor 90 of the sleeping compartment 14 and the under surface 58 of the bed to permit an individual to sit in the chair 34 or on the bench or cabinet support 36 underneath the bed and engage in activities even while another individual is sleeping on the bed sleeping surface. For example, in a specific truck with a raised roof configuration, when the bed is in the bed sleeping position shown in FIG. 3, there is preferably at least 150 cm. of clearance between the under surface of the bed and the floor 90 and, more specifically, about 156 cm. of clearance. In addition, in a truck configuration with a downwardly sloping ceiling, and when the bed is in the bed sleeping position depicted in FIG. 3, a distance of about 50 cm. is provided between the front edge of the upper bed surface 56 and the ceiling, and a clearance of about 80 cm. is provided between the bed sleeping surface at the rear edge of the bed and the interior ceiling of the vehicle. These dimensions may be varied, depending upon the truck configuration, but illustrate specifically preferred dimensions for the truck shown in FIG. 1.

In contrast, when the bed is shifted to the bed storage position shown in FIG. 2 adjacent to the interior ceiling of the truck, about 200 cm. of clearance is provided between the front edge of the under surface of the bed and the floor 90. In addition, about 230 cm. of clearance is provided between the under surface of the bed at the back edge thereof and the floor 90. In a specific embodiment of the invention, 204 cm. of clearance was provided between the floor and front edge of the bed under surface, and 237 cm. of clearance was provided between the floor and the under surface of the bed at the rear edge of the bed. These dimensions may be varied. In providing these dimensions, the dimensions are measured from an uncarpeted floor of the vehicle. It is most preferred that enough clearance be provided between the floor (allowing for carpet and carpet pad, if used, carpet and carpet pad, for example, being about one inch) and the under surface of the front edge of the bed to permit an individual who is over six feet tall, for example, at least about six feet two inches tall, to stand erect and walk underneath the stored bed into the rear portion of the sleeping compartment of the vehicle.

As shown in FIG. 3, when the bed is in the bed sleeping position, the upper bed sleeping surface 56 is substantially horizontal In contrast, when in the bed storage position shown in FIG. 2, in the case where a truck has a sloped ceiling, it is preferred that the bed upper surface or sleeping surface 56 be tilted downwardly moving from front to rear of the vehicle to more closely follow the contour of the ceiling of the vehicle and thereby maximize the available clearance or headroom toward the rear of the sleeping compartment. However, it should be understood that the bed may simply be raised with the sleeping surface being maintained in a horizontal orientation, such as when a flat roofed truck is being used or if lesser head clearance space is desired in a given application.

The illustrated bed shifter 80 in FIGS. 2 and 3 comprises a plurality of bed supports of selectively variable length. Although a single such element could be used, in general the shifting of the bed would be less controlled unless additional mechanical connections were made between the bed and cab structure or between the bed and variable length bed support. By varying the length of the supports, the bed is shifted between the bed sleeping and bed storage positions. In FIGS. 2 and 3, the supports comprise a plurality of flexible elements 100, 102, 104 and 106 Although these elements may take numerous forms such as cables, chains, and the like, in the illustrated form the elements 100–106 comprise a plurality of elongated straps of a strong, durable, flexible material. For example, these straps may be of the same material used in conventional seat belts, with a nylon web of 20 mm. thickness being a specific example The straps 100–106 are coupled to the bed frame 52 in any suitable manner. In FIG. 3, conventional seat belt fasteners 110 are shown for connecting the lower end of the straps 102, 104 to receptacles 112 mounted to the bed frame. This type of connection allows rapid removal of the bed frame if desired, although the straps may be permanently attached to the bed frame.

The bed shifter 80 shown in these figures includes a shaft 116 rotatably coupled to the cab and extending transversely within the cab. Strap receiving elements, such as spools 118, 120, are mounted to the shaft 116, such as being keyed to the shaft. Spools or pulleys 118, 120 rotate with the shaft 116 when the shaft is rotated. Strap 100 is connected to the spool 118, while strap 106 is connected to the spool 120. In addition, strap receiving elements, such as pulleys or spools 122, 124, are also mounted to the shaft 116 for rotation therewith. The pulleys 122, 124 receive the straps 102, 104 which are connected thereto at the rear of the cab. In addition, the strap 102 passes over a pulley 126 pivoted to the cab adjacent the ceiling of the vehicle, generally above the front side 62 of the bed. Similarly, the strap 104 passes over a pulley 128 pivoted to the cab at a location spaced transversely from the pulley 126. The shaft 116 may be rotated in any suitable manner. In the illustrated embodiment, a motor 130 is coupled by drive gears 122 to the shaft for respectively rotating the shaft in opposite directions (e.g. counter-clockwise and clockwise). When rotated in a first direction, the straps 100–106 are wound onto the shaft 116, and more specifically, about the respective spools 118–124, to thereby raise the bed sleeping surface 56 and the bed to the bed storage position. Conversely, rotation of the shaft 116 in the opposite direction by the motor 130 unwinds the straps from the shaft and lowers the bed to the bed sleeping position.

In configurations where the ceiling is sloped, for example forwardly and downwardly, the bed may be tilted as it is raised to more closely orient the bed to match the contour of the ceiling when the bed is in a fully raised position. In the bed shifter of FIGS. 2 and 3, the pulleys or spools 118, 120 are of a larger diameter than the pulleys or spools 122, 124. Consequently, as shaft 116 is rotated to raise the bed, the straps 100, 106 are shortened faster than the straps 102, 104 to thereby raise the rear edge of the bed at a faster rate than the front edge of the bed. Consequently, the bed surface 56 tilts forwardly and away from horizontal as the bed is raised. Conversely, the bed surface 56 tilts rearwardly and toward horizontal as the bed is lowered. Although the design of FIGS. 2 and 3 is advantageously simple, any convenient approach which achieves this differential motion may be used to cause the bed to tilt as it is raised and lowered. If the truck has a flat roof, or for other reasons one does not desire to tilt the bed as it is raised, the spools 118–124 may be of the same diameter.

As shown in FIG. 3, when the bed is in the bed sleeping position, the bed sleeping surface 56 is generally planar and substantially horizontal. In addition, a plurality of inwardly projecting bed supports may extend inwardly into the cab sleeping compartment from the walls of the vehicle. These supports are positioned to engage and carry the bed frame of the bed when the bed is in a bed sleeping position. Consequently, although desirable for safety reasons, the bed shifting mechanism need not be sized to support an individual sleeping on the bed and instead need only be strong enough to raise or lower the bed when the bed is empty. In one specific form, as shown in FIGS. 2 and 3, one such support may comprise an inwardly projecting shelf 140. An interior storage compartment 142 may be suspended downwardly from the support 140 so that the support performs a dual function of carrying the bed and supporting the cabinet, One suitable motor and drive assembly is a Model 1L567 110 amp. electric motor from Dayton of Chicago, Ill. Such a motor is powered from the inverter of a truck. Other motors, such as a 12 volt direct current may be utilized. In addition, although less advantageous, a manual crank may be provided for rotating the shaft 116 to wind up the straps to raise the bed. The motor 130 is typically controlled by a momentary on switch (not shown) to cause the motor to drive the shaft in the appropriate direction for raising or lowering the bed. The switch may be positioned so that the bed is visible to the person controlling the switch.

Figure 4:
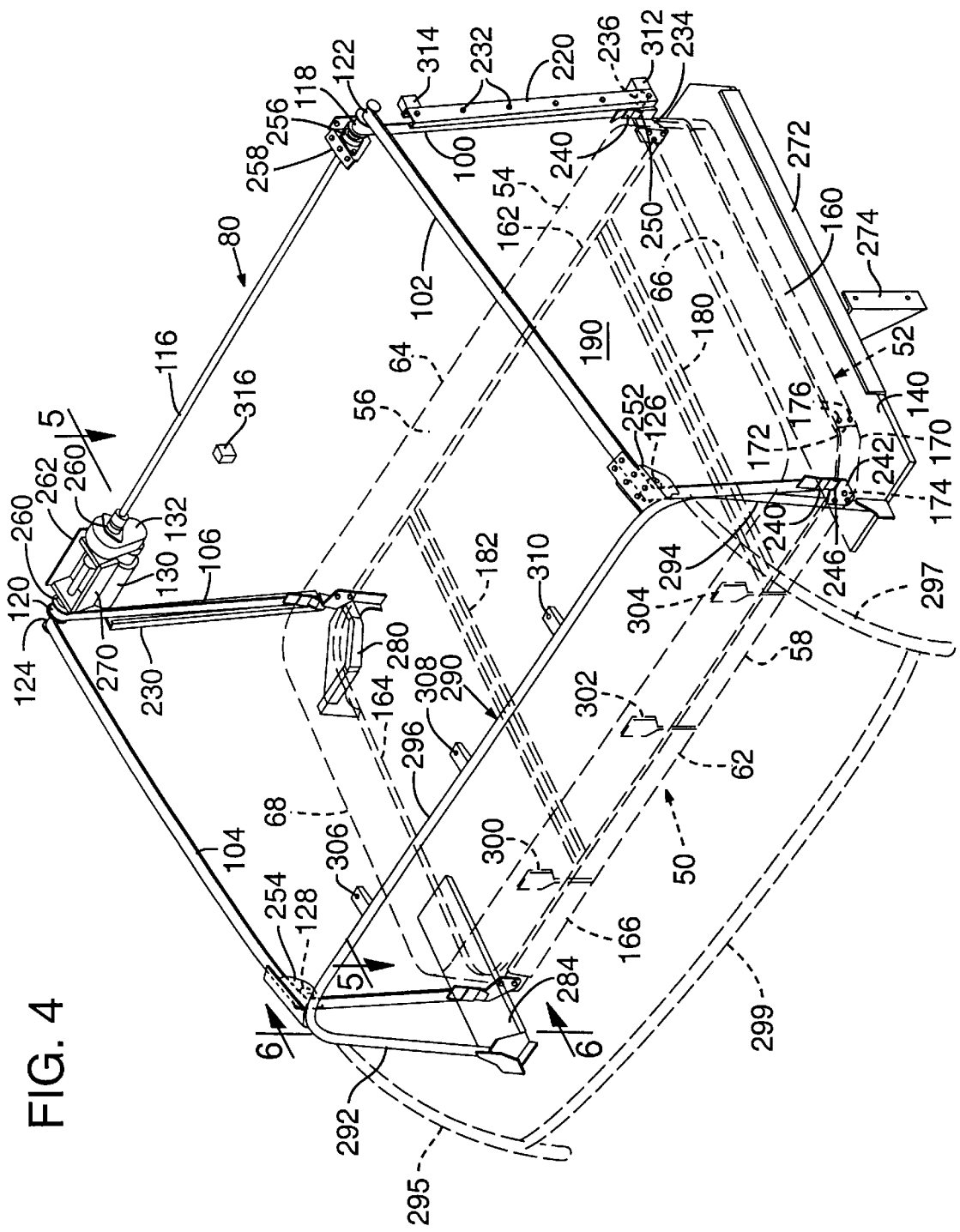
FIG. 4 is a pictorial view of one form of a bed shifting system for raising and lowering a bed within the sleeping compartment of a truck.

A more detailed drawing of the bed shifter 80 of FIGS. 2 and 3 is shown in FIG. 4. Elements in FIG. 4 which correspond to those in FIGS. 2 and 3 have been assigned numbers which are identical to those in the previous figures. These elements will, in general, not be described again.

In the embodiment of FIG. 4, the illustrated bed frame 52 includes an elongated box beam element along each side portion of the bed, such elements being indicated at 160, 162, 164 and 166. These bed frame elements are preferably of a light weight durable material, such as a composite material or aluminum, and are open at their respective ends. Alternatively, the bed, itself, could include components which function as a frame. A corner piece (one being numbered as 170 in FIG. 4) interconnects adjacent end portions of the respective frame elements 160–166. In particular, as shown for corner piece 170, a first end portion 172 is inserted into the end of frame element 160, and a second end portion 174 is inserted into the end of frame element 166. Bolts or other fasteners 176 are utilized to interconnect the bed frame elements and corner pieces to provide a rigid boxlike frame structure.

Figure 6:
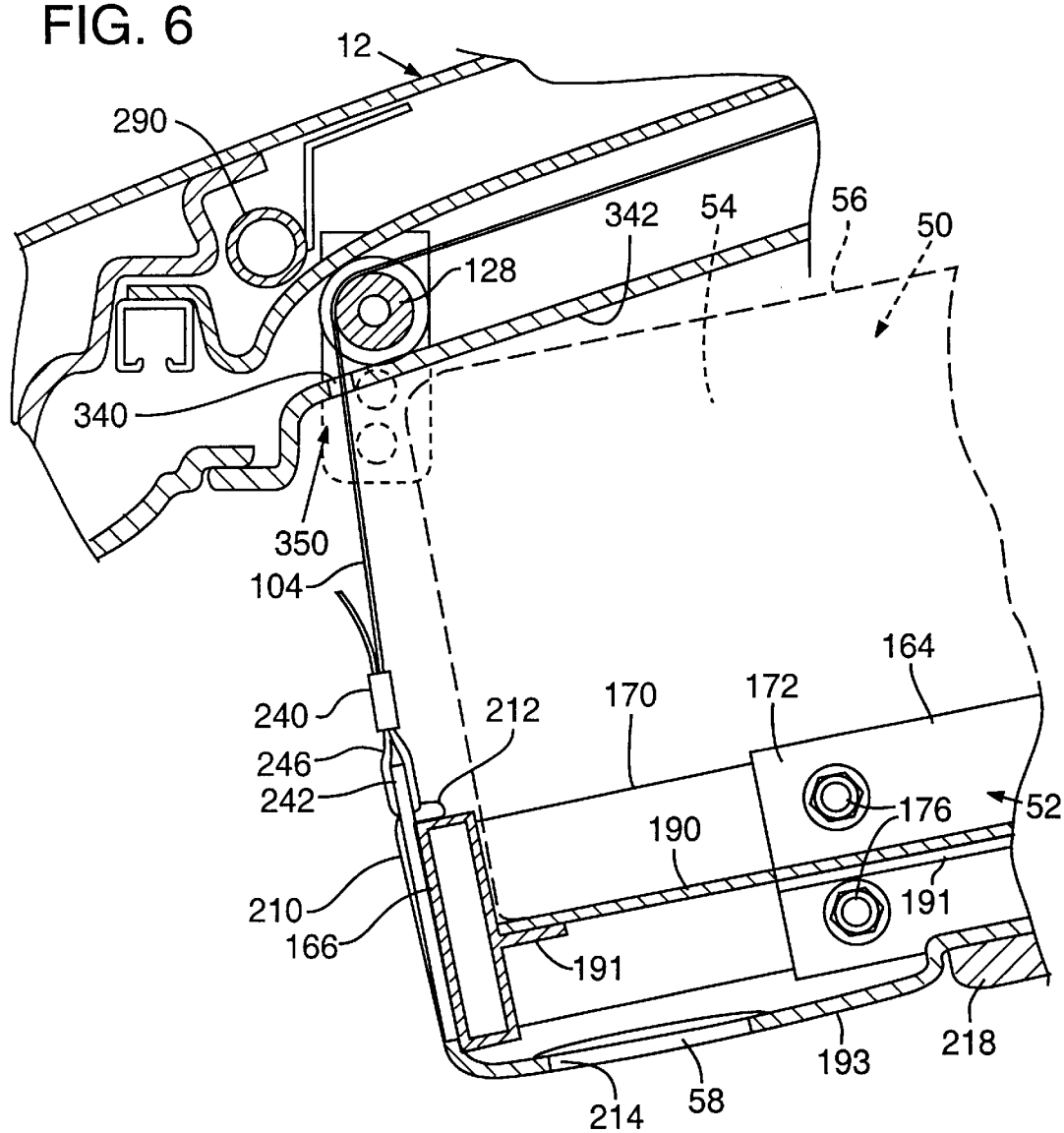
FIG. 6 is a vertical sectional view of an upper forward portion of the bed shifting mechanism of FIG. 4 taken along line 6—6 of FIG. 4.

First and second reinforcing inverted U-shaped (with upper outwardly extending flange portions) channel pieces 180, 182 extend between side frame elements 162 and 166 to reinforce the bed frame. A crosspiece, not shown, may extend transversely between pieces 180, 182, for additional reinforcement and to provide a location to which an under-bed trim piece may be connected. A bed frame bottom piece 190, such as of aluminum, may be supported on the bed frame (see also FIG. 6). For example, aluminum of one-eighth inch thickness, may be used. This material will flex to a limited extent to enhance the comfort of the bed. The elements 160–166 may be extruded or otherwise manufactured and may have an inwardly projecting flange (see 191 in FIG. 6) to support the side edges of the bottom piece. As is also shown in FIG. 6, the bed bottom surface 58 may be defined by a molded or otherwise manufactured cover piece 193, such as of plastic, having front and rear side walls 210 (only the front side wall being shown in FIG. 6). The upper edge of side wall 210 is formed with an inwardly projecting lip 212 which overhangs the upper edge of bed frame corner piece 166 to hold element 193 in place at the front side of the bed frame. The rear side wall typically lacks such a flange and is merely bolted or otherwise fastened in place. The central area of cover piece 193 is secured to the bed frame elements 180, 182 and to a crosspiece extending therebetween. A light may be included in the bed and covered by a lens cap 214. A suitable trim piece, such as 218, may be secured to the underside of bed bottom piece 190 to provide a more finished look to the bed under surface.

Returning again to FIG. 4, in a preferred embodiment of the invention, at least one, and most preferably two, bed motion guiding elements are provided for guiding the motion of the bed as it is shifted between bed sleeping and bed storage positions. In a specific form, first and second spaced-apart elongated parallel upright guide channels 220, 230 are provided. These elements are secured to the rear wall of the truck (or to a bracket, not shown, which is mounted to the truck rear wall), such as by plural fasteners extending through fastener receiving holes in the channel elements, some of these holes being indicated at 232 in FIG. 4. The bed slidably engages the guide channels during operation. More specifically, in the illustrated embodiment, first and second coupling brackets 234, only one being visible in FIG. 4, are coupled to the bed frame (see also FIG. 7). The brackets 234 support guides, such as a rotatably mounted roller 236 carried by the bracket 234 and positioned within the guide channel defined by the element 220. As the bed is raised and lowered, the roller 236 is retained and rolls within the guide element 220 to maintain the rear edge of the bed adjacent to the rear wall of the bed during operation.

In the embodiment of FIG. 4, rather than seat belt connections, the straps are secured to the bed frame utilizing buckles such as the one indicated at 240 in FIG. 4. In particular, a bracket 242 is mounted to the bed frame. This bracket includes a slot positioned to receive a hook 246 which in turn is connected to the associated strap (in this case, strap 102). The hook 246 is inserted into the slot to suspend the bed in place. Similar hooks are provided at the lower end of each of the straps for engaging respective brackets to couple each of the straps to the associated bracket. In particular, the bracket 234 is provided with a slot 250 for engaging a hook at the lower end of the strap 100. Like connections may be utilized for each of the straps and thus will not be described in detail. It should be noted that any suitable strap to bed connection may be used.

Mounting brackets 252, 254, such as shown in FIG. 4, pivotably support the respective pulleys 126, 128. The brackets 252, 254 are mounted to the ceiling of the truck by fasteners, not shown. One end of the shaft 216 is journaled by a bearing 256 to a mounting bracket 258 which is secured to the ceiling and rear wall of the truck. The opposite end of the shaft 116 is journaled by bearings 260 to a mounting bracket 262 which is also mounted to the rear wall of the truck. The bracket 262 includes an outwardly projecting motor mounting flange portion 270 to which the motor 230 and associated drive gearing 232 is connected.

The bed supporting shelf 140, as shown in FIG. 4, extends the full width of the bed and is mounted to the side wall of the truck by an angle bracket 272 and a shelf bracket 274. The interior cabinet (142, FIG. 3) may be hung from the shelf 140. A rear corner shelf 280 is coupled to the rear wall and side wall of the truck and projects inwardly toward the interior of the sleeping compartment from these walls. A shelf 284 is also supported by brackets which are secured to the side wall of the truck. The shelves 140, 280 and 284 comprise one form of bed support for supporting the bed when in the bed sleeping position. Although less preferred, the bed shifter 80 may itself support the bed in all positions. The underside of the bed frame is typically provided with bumpers, such as rubber or other resilient material, at the corners thereof for abutting the supports 140, 280 and 284 when the bed is in the bed lowered or sleeping position, As shown in FIG. 4, a reinforcing element 290, such as of an inverted U-shaped configuration, is provided. Element 290 has side legs 292, 294 and a crosspiece 296. The crosspiece 296 extends transversely from side wall to side wall of the sleeping compartment. The reinforcement 290 is optional but does provide additional strength to the roof to support a bed. As shown in FIG. 4, the brackets 252, 254 may be connected at their forward ends to element 290. Reinforcement 290 may be of tubular construction, such as a one-inch diameter steel tubing of one-eighth inch wall thickness. The side legs 292, 294 of the reinforcement are connected at their lower ends by brackets to the side wall framework of the vehicle and, more specifically, to the B-pillar (behind the driver and passenger seats) frame structure of the cab. Forward reinforcement may be provided by legs 295, 297 and a crosspiece 299, which may be of the same material as reinforcement 290. Elements 295, 297 and 299 may extend forwardly to the A-pillar of the vehicle structure (ahead of the front doors) with crosspiece 299 being positioned above the truck windshield. Like elements 292, 294 and 296, elements 295, 297 and 299 are preferably concealed from view by a vehicle occupant. A plurality of belt receiving fasteners, such as 300, 302 and 304, which may be conventional seat belt receptacles, are coupled to the bed frame. Each of these fasteners are positioned beneath a respective safety net support bracket 306, 308 and 310 mounted to the reinforcement 290. Safety netting, such as a conventional nylon webbing of straps formed in a netlike configuration may be secured to the brackets 306, 308 and 310 and also to the connectors 300, 302 and 304 for safety reasons. That is, in the event the vehicle suddenly stops, an individual sleeping on the bed sleeping surface will not roll off the bed as the webbing will retain the person on the bed.

A user of the bed of FIG. 4 may, for example, turn the motor on to cause the bed to raise or lower, depending upon the direction the motor operates the shaft 116. When the bed reaches the desired position, the operator may simply turn the motor off. In addition, bed position sensors may be provided to control the operation of the motor. Although the sensors may take various forms, they are designed to cause the motor to stop operating when the bed reaches preselected positions. In one form, such position sensors include limit switches 312, 314 mounted to guide track 220 and coupled to the motor control circuit. These limit switches are engaged by the roller 236 to cause the motor circuit to open and stop the motor from operating. In FIG. 4, limit switch 312 is located at a bed sleeping position location, while limit switch 314 is located at a bed storage location. Consequently, when switch 312 is engaged, the position of the bed is sensed at a bed sleeping position and the motor is stopped. Conversely, when the bed is raised to the point where roller 236 engages switch 314, the bed is sensed in the bed storage position and operation of the motor is stopped. Although less preferred, other limit switches may be used to stop the bed at intermediate positions between the upper and lower positions shown in FIG. 4, as it is possible for a user to climb into the bed and sleep there, even if the bed is not totally lowered. This would provide additional clearance for an individual working beneath the bed. Although not shown, other controls may also be used. For example, a motor load sensor may be used to sense excessive load on the motor. This will protect the motor in the event the motor is caused to operate and the bed is blocked from reaching the upper or lower positions shown in FIG. 4 (eog. by a suitcase on the bed or something stored beneath the bed). Additional sensors, such as a pressure sensor indicated at 316, may also be utilized and coupled to the motor circuit to cause the circuit to open and stop the operation of the motor in the event the bed presses against the sensor with a force greater than a maximum force established by the sensor. Instead of a pressure sensor, a weight sensor may be used to block the motor from operating in the event too much weight (for example, a sleeping individual) is on the bed sleeping surface. Moreover, the motor may be provided with an obstacle sensor of other forms, such as conventionally used in garage door systems for reversing the direction of operation of the motor in the event an obstacle is encountered as the bed is raised to the bed sleeping position. However, in many applications, this is less preferred because it is desirable for the bedding to be compressed against the ceiling when the bed is in the bed stored position to thereby provide additional clearance between the underside of the bed and the floor of the truck. In the most preferred form, a simple up-down momentary on switch is used in combination with the limit switches as a bed user is in position to watch the bed as it is raised and lowered.

Figure 5:
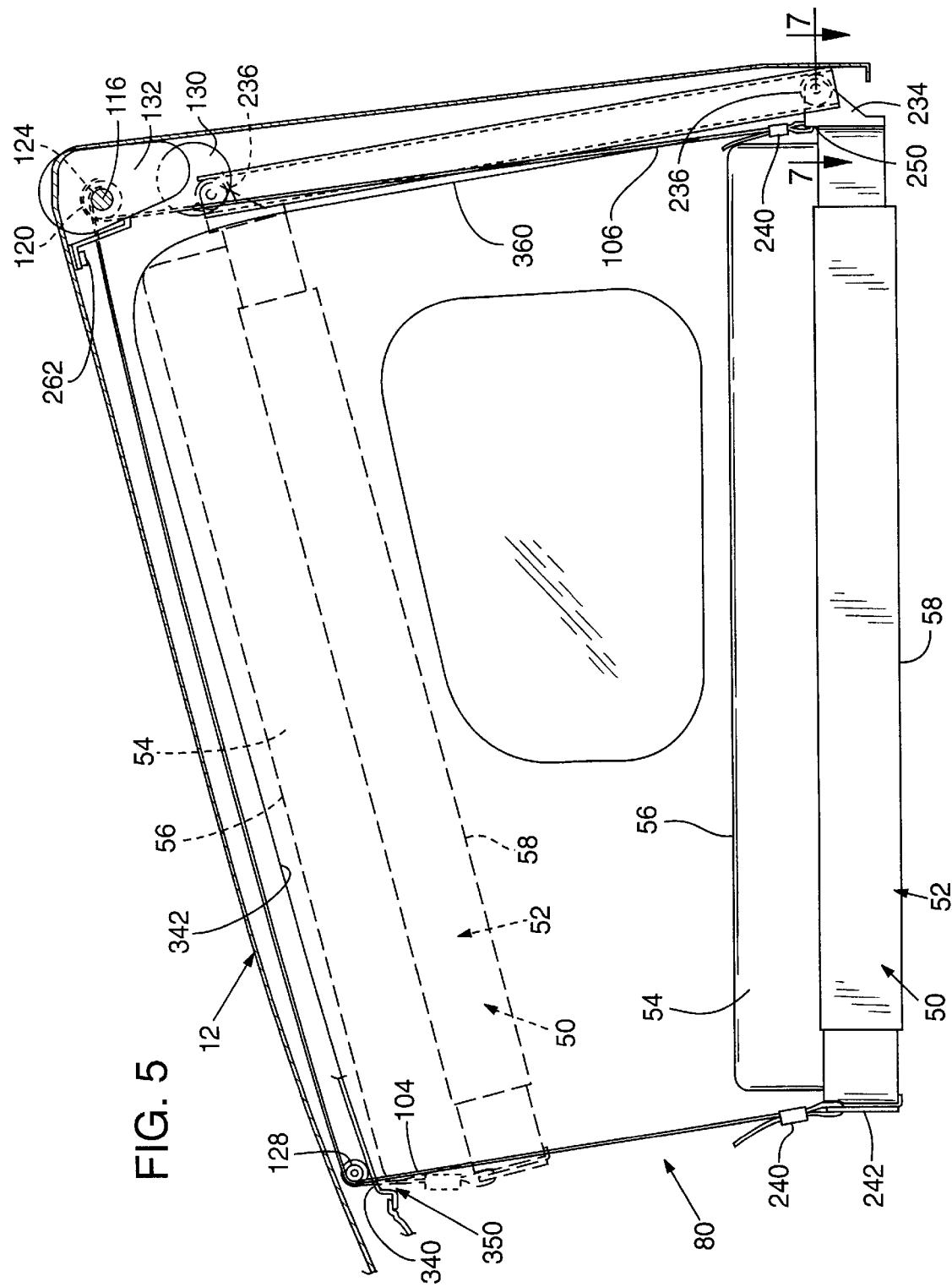
FIG. 5 is a vertical sectional view of the bed shifting mechanism of FIG. 4 taken along lines 5—5 of FIG. 4.

Referring to FIG. 6, the bed 50 is shown in dashed lines as it approaches a bed storage position. In FIG. 5, the bracket 234 is illustrated in a slightly different form from that shown in FIG. 4. FIG. 5 illustrates how the strap 104 extends through a slot 340 in a ceiling 342 of the truck. When in this position, the strap 104 (as well as the strap 102 at the opposite side of the truck) is positioned substantially in the ceiling of the vehicle where the strap is concealed from view. In addition, the rear straps 100, 106 may be positioned behind panel components at the rear wall of the vehicle to conceal such straps from view. Therefore, the construction provides an aesthetically pleasing appearance. As can be seen in FIG. 6, a recess 350 is provided in the ceiling of the vehicle in the sleeping compartment area. The illustrated recess is relatively shallow; however, it allows the bed to be drawn at least partially into the recess. The ceiling may be configured to provide a recess 350 which has enough depth to allow the bed to be totally received in the recess. In this latter case, the bottom or under surface 58 of the bed would be substantially flush with remaining portions of the ceiling.

Figure 7:
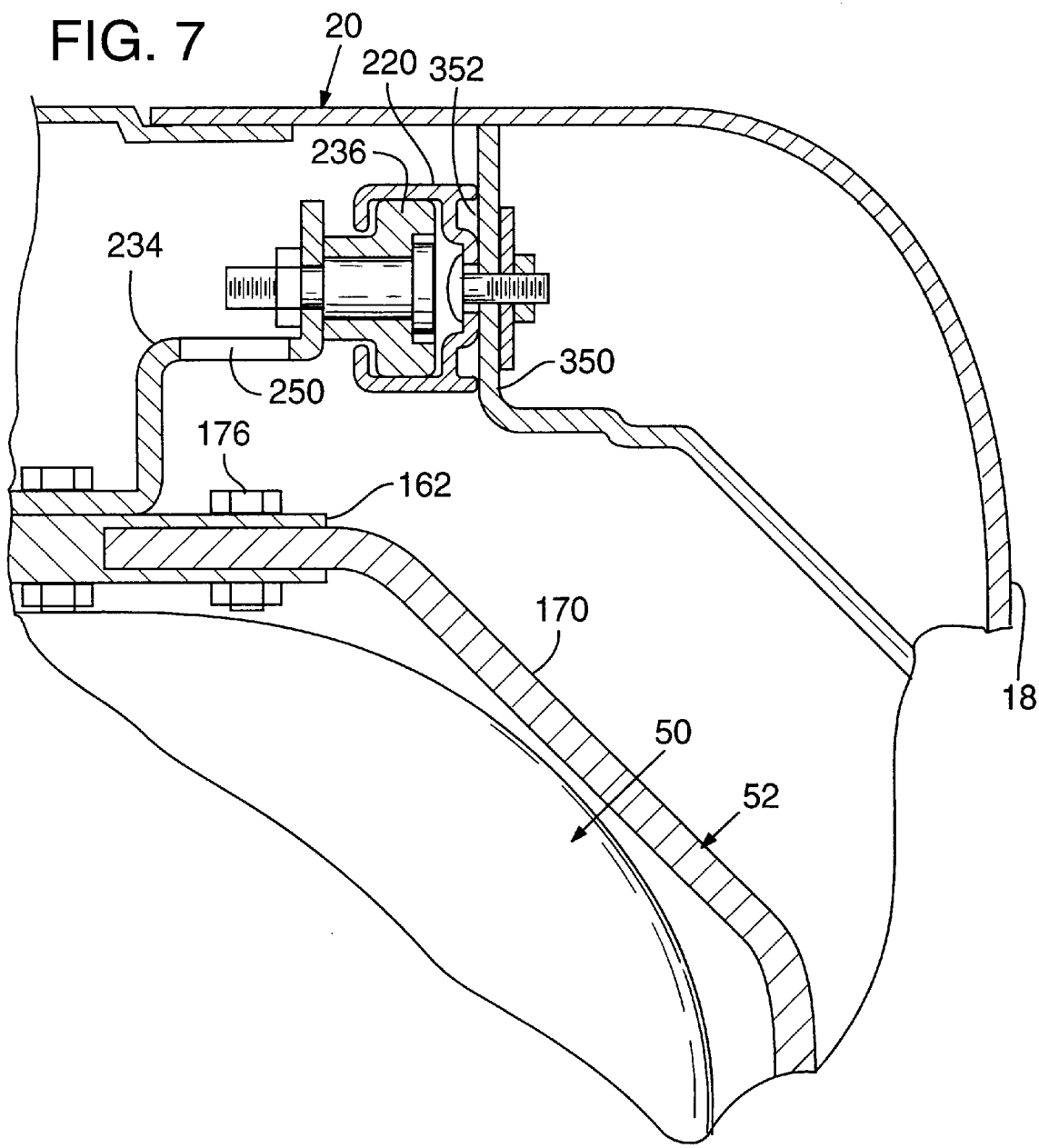
FIG. 7 is a horizontal section through a lower rear portion of the bed shifting mechanism of FIG. 4 taken along line 7—7 of FIG. 5.

FIG. 7 illustrates the channel 220 and its mounting to the cab structure in greater detail. In particular, the illustrated cab structure includes a corner piece 350, with a mounting surface 352 to which the channel 220 may be fastened. Alternatively, the channel 220 may be found in the surface 352. In addition, the channel may alternatively be mounted to a bracket coupled to the rear wall. The illustrated corner piece 350 extends from the rear wall 20 of the cab to the side wall 18 of the cab. Piece 350 may take other forms, for example, it may be a bracket mounted to the back wall of the truck.

FIG. 5 schematically illustrates the bed shifting mechanism 80 and in particular illustrates the concealment of the straps 104 and 106 in the respective ceiling areas and rear wall areas of the truck so that, when the bed is raised to a bed storage position, only a small portion of the lowermost end and forwardmost end of strap 104 would be visible. When in the bed storage position shown in FIG. 5, the sides of the bed have all been shifted upwardly along with the bed sleeping surface 56 toward the ceiling 342 of the sleeping compartment As can be seen in this figure, the bed surface 56 is adjacent to the ceiling 342 and may, in fact, abut the ceiling. Typically, the bed surface 56 is positioned within at least about four inches of the ceiling 342. However, bed surface 56 may be positioned further away from the ceiling surface 342 when the bed is in the bed storage position, although this will result in a sacrifice of clearance between the underside of the bed 58 and the floor of the sleeping compartment.

Figure 8:
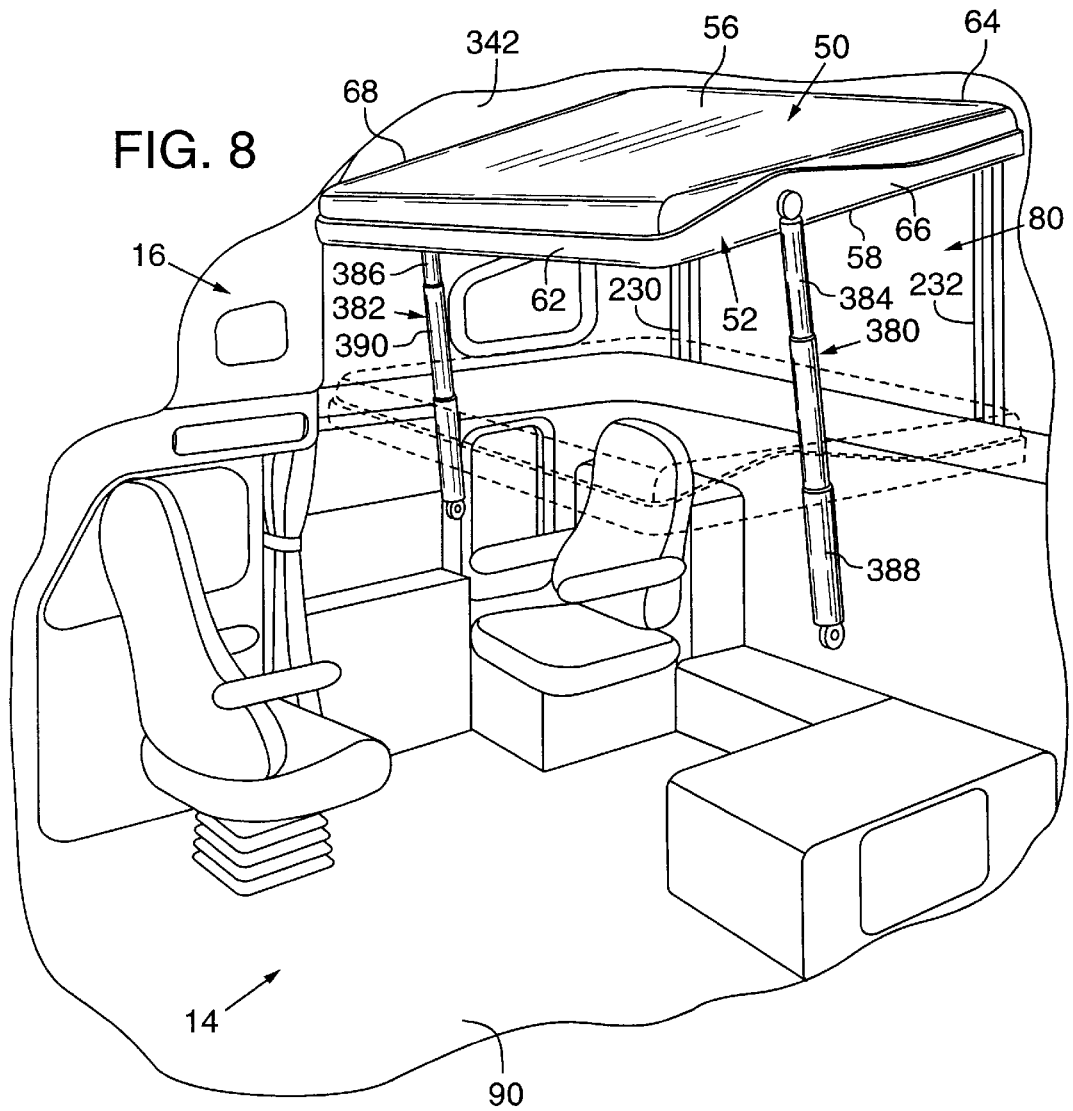
FIG. 8 illustrates an embodiment of the present invention utilizing fluid cylinders for raising and lowering the bed within a sleeping compartment of a truck.

FIG. 8 illustrates an embodiment wherein the bed shifter 80 includes a different form of bed support of variable length for raising and lowering the bed between bed sleeping and bed storage positions. In the embodiment of FIG. 8, a plurality of fluid cylinders, in this case a pair of such cylinders 380, 382 are utilized. The fluid cylinders 380, 382 may be powered from the pneumatic air lines of the truck or may be powered from a hydraulic system on the truck. One example of a lifting cylinder is a rod and telescopic cylinder from Dana Corporation of Lancaster, Tex. Such cylinders are available in a variety of stroke length and may be selected for the specific vehicle cab configuration. The cylinders 380, 382 are coupled between the cab and bed frame. In the illustrated embodiment, the respective rod ends 384, 386 of cylinders 380, 382 are pivoted to respective ends 66, 68 of the bed frame 52. This embodiment may also include guide tracks 230, 232 within which rollers (e.g. roller 236) coupled by a bracket 234 to the bed frame may be guided to guide the motion of the bed. In this construction, the cylinders 380, 382 are extended to raise the bed to the bed storage position and retracted to lower the bed from the bed storage position. The cylinder or housing portions 388, 390 of elements 380, 382 are pivotably coupled at their lower end to the respective side walls of the cab.

Figure 9:
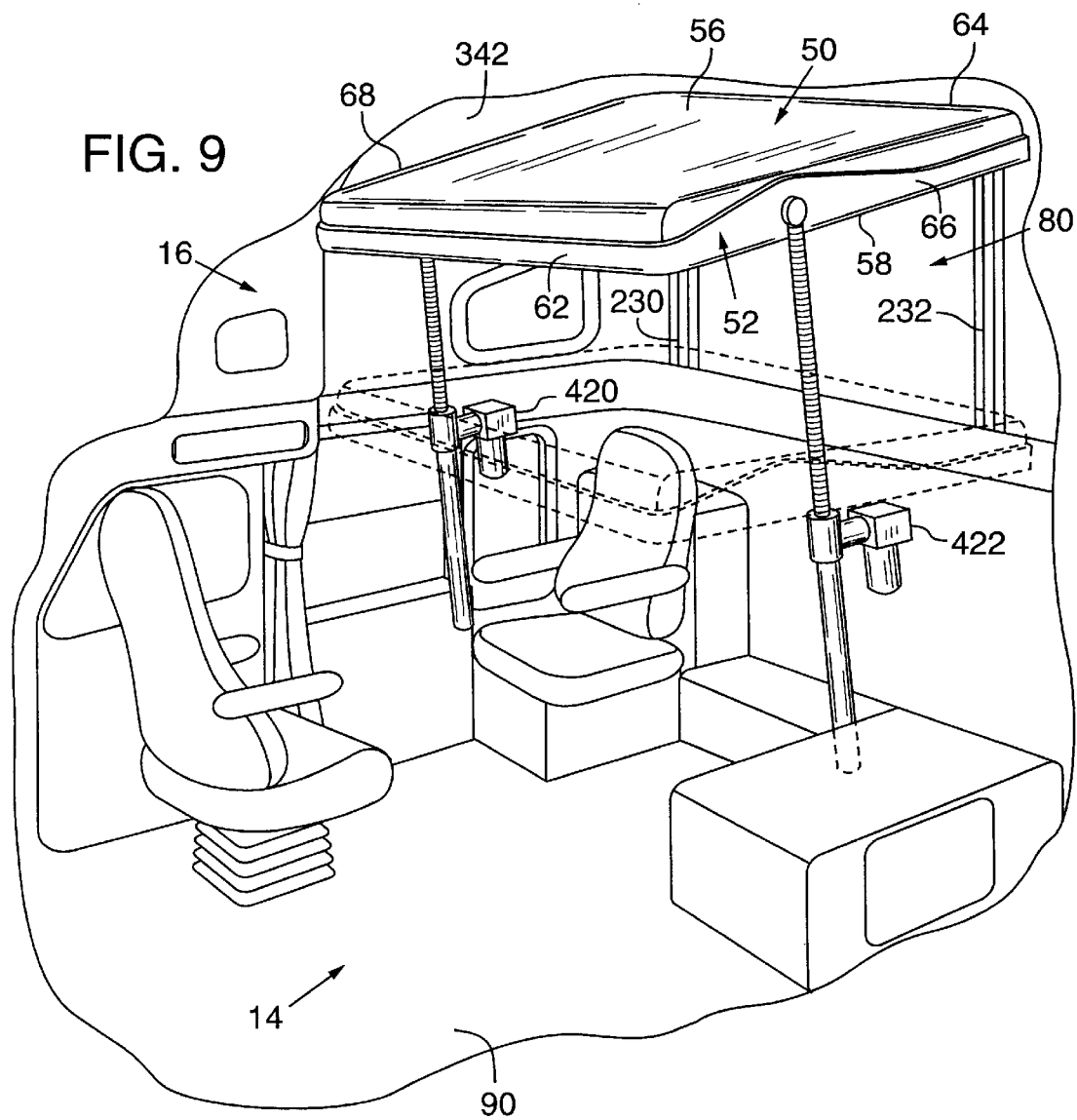
FIG. 9 is a perspective view of an alternative embodiment of the present invention utilizing screw jacks for raising and lowering the bed.

Operation of the cylinders may be controlled in the same manner as the motor 120 in the previously described embodiments of the present invention. However, typically the stroke of the cylinder is set to precisely move the bed the desired distance between bed sleeping and bed storage positions. Appropriate fluid pressure relief elements may be included in the fluid circuit operating these cylinders to, for example, bleed fluid and stop the operation of the cylinder in the event an obstacle is encountered In the embodiment of FIG. 9, the bed support elements of variable length may comprise a plurality of screw jacks such as a worm gear screw jack available from Joyce/Dayton Corp. of Dayton, Ohio. These jacks may be manually or motor driven and may be controlled in the same manner as described previously for motor 120. In the FIG. 9 embodiment, a plurality of screw jacks are illustrated, in this case two such jacks 420, 422 coupled between the cab structure and the bed frame. More specifically, jack 422 is connected to the bed frame adjacent the end 66 of the bed frame, while the jack 420 is coupled to the bed frame adjacent to the end 68 of the bed frame. The screw jacks 420, 422 are operable in the same manner as the cylinders 380, 382 described previously in connection with FIG. 8, to raise and lower the bed between the bed storage and bed sleeping positions.

FIG. 10 schematically illustrates a bed shifting system employing a scissors mechanism, one such mechanism being indicated at 460 in FIG. 10. Most preferably a pair of scissors mechanisms are utilized, with one such mechanism being positioned at each end of the bed 50. In the embodiment shown, the scissors mechanism includes first and second arms 462, 464 with respective longitudinally extending slots 466, 468. A pin 470 couples these elements together and extends through the slots such that the pin is free to slide along the slots. A first end 472 of arm 464 is pivotably connected to the bunk frame at location 474. A first end 478 of arm 462 is pivoted at location 480 to the cab frame. The second or opposite end 482 of arm 462 is loosely coupled at location 484 by a slide pin (not shown) which slidably couples the end portion 482 of arm 462 to the bed frame for sliding along a slot 486 provided in the bed frame. As the end 490 of arm 464 (opposite to the end 472) is pulled downwardly and forwardly in FIG. 10, the pin 470 shifts along the path indicated by arrow 492 to the location shown in dashed lines in FIG. 10. Similarly, location 472 shifts to the position shown in dashed lines in this figure, and location 484 similarly shifts to the location 484 indicated in dashed lines When in the dashed line position, the bed 50 is shifted to the bed storage position shown in dashed lines in FIG. 10 from the bed sleeping position shown in solid lines in this figure. Although not shown, a lever may be attached to the end 490 of arm 464 to provide additional leverage when grasped and pulled by a user. Alternatively, a motor may be utilized to engage and move the arm 464 to raise the bed. In an alternative configuration, the scissors structure may extend downwardly from the ceiling to support the bed from above. Although useful and relatively mechanically simple, a scissors construction typically results in exposed mechanical parts which could pinch a user when the scissors construction is utilized, in the absence of special covering mechanisms.

Figure 11A:
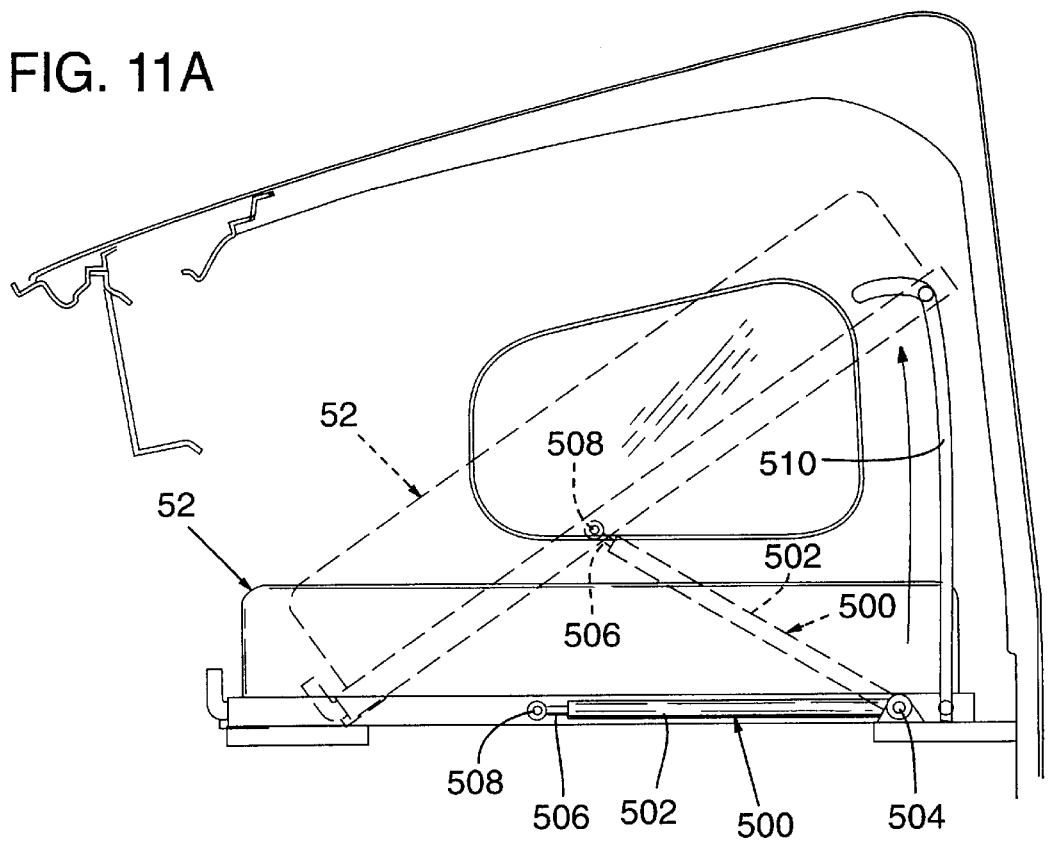
FIG. 11A illustrates an embodiment of the present invention utilizing a gas strut for limiting the rate at which the bed may be shifted between the bed sleeping and bed storage positions.
Figure 11B:
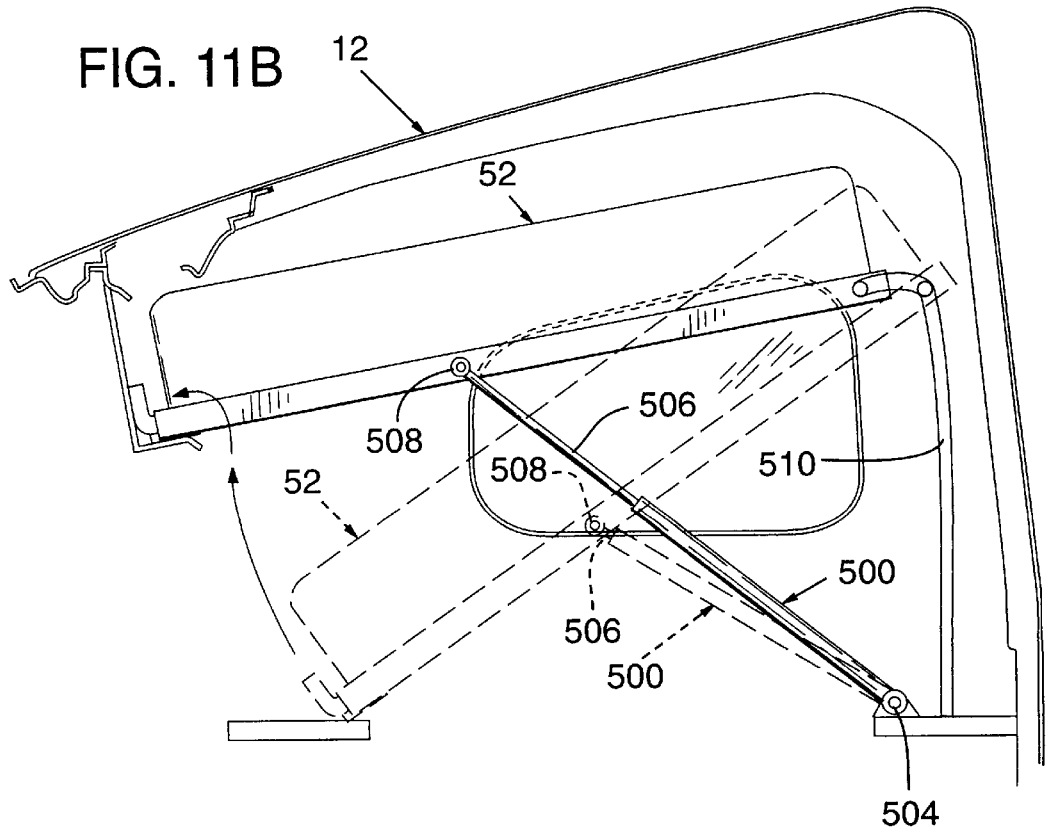
FIG. 11B is an alternative embodiment of the present invention including a pocket defined in the ceiling for receiving a forward edge of the bed when the bed is in a bed storage position.

Referring to FIGS. 11A and 11B, another form of bed shifting mechanism is illustrated. In each of these embodiments, at least one fluid strut 500 is used. Most preferably, a plurality of such struts are employed, such as one such strut being coupled between the cab structure and the bed frame at one end of the bed and another such strut being coupled to the cab structure and bed frame at the opposite end of the bed. In particular, as shown in FIGS. 11A and 11B, a housing portion 502 of the strut is pivoted at 504 to the cab structure, while a rod end 506 of the strut 502 is pivoted at 508 to the bed frame 52. In addition, at least one guide track, and preferably a pair of spaced-apart upright elongated guide tracks, such as 510 in FIG. 11A, are mounted to the side walls of the vehicle. Bracket mounted guides, such as rollers, travel within the guide tracks to guide the motion of the bed. In particular, in FIG. 11A, a bracket mounted roller is mounted to a rear portion of the bed (not shown in this figure) for traveling in the guide track.

In operation, assuming a case where no optional pocket 530 is provided, a user pushes the rear end of the bed upwardly toward the ceiling as shown in FIG. 11A until the bed engages a latch (not shown). Thereafter, the user pushes the front edge of the bed upwardly until it is latched by a latch (not shown). Consequently, the bed may be manually raised between bed sleeping and bed storage positions. The fluid struts limit the rate at which the bed may be raised and lowered. Consequently, when the front edge of the bed in FIG. 11A is released, the bed slowly drops downwardly. Similarly, when the rear edge of the bed is released, the rear edge drops downwardly. In the FIGS. 11A and 11B form of the invention in the embodiment where a pocket is provided, the front edge of the bed is raised first and, as the rear edge of the bed is raised, the bed is guided by the track 510 into the pocket 530. The fluid struts of FIGS. 11A and 11B may be utilized with the bed shifting mechanisms of the other embodiments of the present invention to limit the rate at which the bed is shifted between bed sleeping and bed storage positions.

Figure 12:
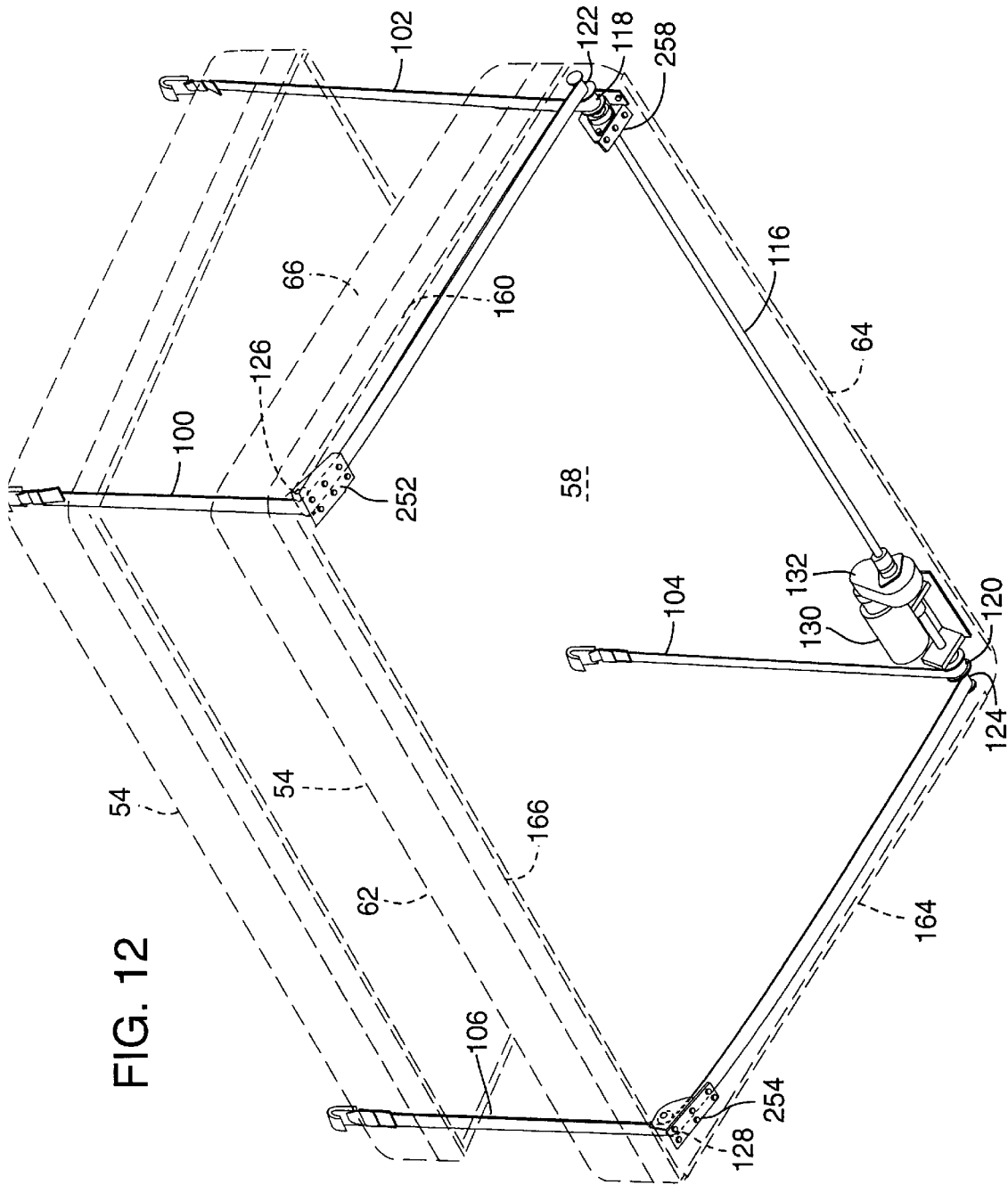
FIG. 12 illustrates an embodiment of the bed shifting system of the present invention incorporated into a bed to thereby simplify the interconnection of the system to a vehicle.

FIG. 12 schematically illustrates an embodiment of the invention which is like the FIGS. 2 and 3 embodiment, except that, in this embodiment, the bed contains the bed raising and lowering mechanism. Consequently, this structure is easy to retrofit into an existing truck. In addition, this structure may be preassembled and available as a subcomponent for ready installation into trucks when a customer requests a bed with a bed shifting system in accordance with the present invention. In the FIG. 12 form of the invention, the straps 100–106 each include a hook at their upper end, with hook receiving brackets (not shown) being mounted to the truck ceiling at appropriate locations to receive the strap brackets. In FIG. 12, the shaft 116 may be contained inside the bed frame structure In addition, the pulleys 118–124 may be mounted to the shaft 116 within the bed frame structure. Also, the pulleys 126, 128 are pivoted to the bed frame. The motor 120 and gearing 122 may be contained within a housing which is mounted to the underside of the bunk structure and is typically contained at least partly within the bunk structure to minimize the downwardly projecting portion of the housing. However, since the housing is located at the rear corner of the bunk structure, very little interference would be provided with the desired clearance by this configuration. A power cable (not shown) would couple the motor to respective sensors, switches and a source of power, for example, in the same manner as the motor 120 in FIGS. 2 and 3 embodiments. The bed structure of FIG. 12 is shifted between a bed sleeping position shown in solid lines in FIG. 12 and a bed storage position adjacent to the ceiling of the truck shown in dashed lines in FIG. 12. In addition, the pulleys 120, 118 may be larger in diameter than pulleys 122, 124 for reasons previously explained so that as the bed is raised it tilts to more closely assume the configuration of the ceiling of the truck if the truck has a downwardly sloped ceiling.

In any of the bed constructions described above, mechanical latches (for example, on shelves 140 and 284 in FIG. 4) may be used to hold the bed in respective sleeping and storage positions.

It should be apparent to those of ordinary skill in the art that the present invention may be modified in arrangement and detail without departing its principals. For example, alternative bed shifting systems may be used to raise and lower the bed. Also, the invention has been described for convenience with reference to trucks, but has applicability to other land vehicles as well. Land vehicles in this case refer to vehicles such as trains, buses and the like which travel along the ground. We claim as our invention all embodiments which fall within the scope of the following claims.

We claim:

1. A vehicle comprising:
    a cab having a sleeping compartment with first and second side walls, a rear wall, a ceiling and a floor;
    a bed positioned in the sleeping compartment, the bed having a sleeping surface, side edge portions and a bed under surface opposite to the sleeping surface;
    a bed shifter coupling the bed to the cab and operable to shift the bed from at least one sleeping position in which the bed sleeping surface is spaced from the ceiling so as to permit a user to recline on the bed sleeping surface to a storage position in which the bed sleeping surface and side edge portions of the bed are shifted upwardly toward the ceiling to position the bed sleeping surface adjacent to the ceiling, the bed shifter having at least one elongated bed motion guiding track mounted to the rear wall and defining a non-vertical rear bed side motion channel and a guide roller attached to the bed and rotabably engaged with the guiding track to roll along the channel as the bed shifts between sleeping and storage positions, whereby additional clearance is provided between the bed under surface and the floor when the bed is in the bed storage position.

2. A vehicle according to claim 1 in which the bed shifter comprises a plurality of bed supports of selectively variable length coupled to the bed such that adjusting the length of the supports shifts the bed between the sleeping and storage positions.

3. A vehicle according to claim 2 in which the bed supports comprise a plurality of fluid cylinders.

4. A vehicle according to claim 2 in which the bed supports comprise a plurality of screw jacks.

5. A vehicle according to claim 2 in which the bed supports comprise a plurality of flexible elements which suspend the bed downwardly below the ceiling as the bed is shifted between sleeping and storage positions.

6. A vehicle according to claim 5 including a shaft coupled to the flexible elements, a motor coupled to the shaft for rotating the shaft such that rotation of the shaft in a first direction winds the flexible elements about the shaft to raise the bed and rotation of the shaft in a second direction opposite to the first direction unwinds the flexible elements from the shaft to lower the bed.

7. A vehicle according to claim 6 in which a first set of flexible elements is coupled to the bed adjacent to the rear wall of the sleeping compartment and a second set of flexible elements is coupled to the bed at a location spaced further away from the rear wall than the first set of flexible elements, the first set of flexible elements being coupled to the shaft so as to be wound and unwound from the shaft at a faster rate than the second set of flexible elements such that the bed sleeping surface tilts forwardly from horizontal as the bed is raised and tilts rearwardly toward horizontal as the bed is lowered.

8. A vehicle according to claim 6 in which the flexible elements are substantially enclosed by the ceiling and rear wall of the sleeping compartment at least when the bed is in the bed storage position.

9. A vehicle according to claim 6 in which the flexible elements comprise elongated straps.

10. A vehicle according to claim 6 including bed position sensors coupled to the motor, the motor being responsive to the bed position sensors to stop operating upon the bed position sensors sensing the positioning of the bed at pre-selected positions.

11. A vehicle according to claim 1 including an obstacle sensor coupled to the motor, the motor being responsive to the obstacle sensor to reverse the direction of rotation of the shaft to lower the bed upon the detection of an obstacle as the bed is being raised.

12. A vehicle according to claim 1 including a recess in the ceiling of the sleeping compartment positioned to receive the bed sleeping surface when the bed is moved to the bed storage position.

13. A vehicle according to claim 1 including a bed position sensor operable to sense the positioning of the bed in respective bed storage and bed sleeping positions.

14. A vehicle according to claim 1 including a fluid strut coupled to the bed and cab and operable to limit the rate of movement of the bed between bed storage and bed sleeping positions.

15. A vehicle according to claim 1 in which the bed shifter comprises a scissors structure.

16. A vehicle according to claim 1 in which the first and second side walls include bed supports projecting inwardly into the sleeping compartment so as to support the underside of the bed when the bed is in a bed sleeping position, at least one of the supports also being coupled to at least one interior storage cabinet positioned below said at least one of the supports.

17. A vehicle comprising:

a cab having a front, rear and a sleeping compartment at the rear of the cab, the sleeping compartment having first and second side walls, a rear wall, a ceiling and a floor, the ceiling being generally sloped downwardly in the area of the sleeping compartment moving from the rear of the cab toward the front of the cab;

an elongated bed positioned in the sleeping compartment, the bed having first and second ends and first and second sides, the bed being oriented to extend transversely within the sleeping compartment with the first end of the bed adjacent to the first side wall, the second end of the bed adjacent to the second side wall, and with the second side of the bed adjacent to the rear wall, the bed being movable from at least one sleeping position to a storage position, the bed having a sleeping surface which is generally horizontal and spaced from the ceiling to accommodate a user sleeping on the sleeping surface when the bed is in the sleeping position, the bed sleeping surface being positioned adjacent to the ceiling and inclined downwardly from the rear toward the front of the cab when the bed is in the bed storage position wherein when the bed is in the bed storage position, the first side of the bed is spaced from the rear wall and is at a lower elevation than the second side of the bed such that the sleeping surface tilts downwardly away from the rear wall.

18. A vehicle according to claim 17 in which the ceiling includes a recess positioned to receive the bed sleeping surface when the bed is in the bed storage positions.

19. A vehicle according to claim 17 in which the bed has an under surface opposed to the sleeping surface, the under surface being spaced by at least 200 cm. from the floor when the bed is in the bed storage position.

20. A vehicle comprising:

a cab with a sleeping compartment, the sleeping compartment having first and second side walls, a rear wall, a floor and a ceiling;

a bed positioned in the sleeper compartment, a plurality of elongated support elements coupling the bed to the sleeper compartment, the support elements being selectively variable in length such that adjusting the length of the support elements raises or lowers the bed within the sleeper compartment;

the elongated bed support elements comprising a plurality of flexible elements which suspend the bed downwardly below the ceiling as the bed is shifted between sleeping and storage positions;

a rotatable shaft coupled to the flexible elements, a motor coupled to the shaft for rotating the shaft such that rotation of the shaft in a first direction winds the flexible elements about the shaft to raise the bed and rotation of the shaft in a second direction opposite to the first direction unwinds the flexible elements from the shaft to lower the bed;

a first set of flexible elements being coupled to the bed adjacent to the rear wall of the sleeping compartment and a second set of flexible elements being coupled to the bed at a location spaced further from the rear wall than the first set of flexible elements, the first set of flexible elements being coupled to the shaft so as to be wound and unwound from the shaft at a faster rate than the second set of flexible elements such that the bed sleeping surface tilts forwardly from horizontal as the bed is raised and tilts rearwardly toward horizontal as the bed is lowered;

at least one non-vertical upright elongated bed motion guiding track mounted to the rear wall and coupled to the bed so as to guide the motion of the bed as it shifts between bed sleeping and bed storage positions; and a guide roller pivoted to the bed and positioned in rolling engagement with the track, the roller following the track to guide the motion of the bed.

21. A vehicle according to claim 20 including bed position sensors coupled to the motor, the motor being responsive to the bed position sensors to stop upon detection of the bed at preselected positions by the bed position sensors.

22. A vehicle according to claim 20 wherein the cab has a longitudinal axis, the bed having a longitudinal axis which is oriented transverse to the longitudinal axis of the cab, the bed having first and second opposed sides and first and opposed second ends, the first side being positioned adjacent to the rear wall, the first set of flexible elements comprising first and second spaced-apart straps coupled to the first side of the bed and the second set of flexible elements comprising spaced-apart straps coupled to the second side of the bed.

23. A vehicle according to claim 22 in which the straps are substantially enclosed in the ceiling and rear wall of the sleeper compartment at least when the bed is in the bed storage position and bed position sensors coupled to the motor, the motor being responsive to the bed position sensors to stop upon detection of the bed at preselected positions by the bed position sensors.

24. A vehicle according to claim 20 in which the ceiling has a recess positioned to receive the bed sleeping surface when the bed is in the bed storage position.

25. A raisable bed assembly for a vehicle cab of the type which has a ceiling which slopes forwardly toward the front of the vehicle, rear wall, first and second side walls and a floor, the bed assembly comprising:
- a bed having opposed major bed sleeping and bed under surfaces;
- a bed shifter coupled to the bed and coupling the bed to the vehicle cab, the bed shifter being operable to raise the bed from a sleeping position toward the ceiling and to a bed storage position, the bed shifter being operable to tilt the bed sleeping surface as the bed is raised and to position the bed in engagement with at least a portion of the sloped ceiling of the vehicle when the bed is in the bed storage position.

26. A raisable bed assembly according to claim 25 in which the bed shifter comprises a plurality of flexible elements adapted to suspend the bed from the vehicle ceiling, a shaft coupled to the flexible elements, and a motor coupled to the shaft to rotate the shaft in a first direction to wind up the flexible elements on the shaft to raise the bed and to rotate the shaft in a second direction opposite to the first direction to unwind the flexible elements from the shaft to lower the bed, the motor being positioned at the side of the bed when the bed is in the bed storage position.

27. A vehicle according to claim 25 in which the ceiling includes a ceiling recess positioned to receive the bed when in the bed storage position with a lower surface of the bed being exposed to the interior of the vehicle cab.

28. A method of selectively increasing the available living space in a sleeping compartment of a vehicle comprising:
- positioning a bed in the sleeping compartment in an upper berth sleeping position with a sleeping surface of the bed facing upwardly, the bed having opposing front and rear sides, the rear side being positioned adjacent to the rear wall of the vehicle;
- raising the bed and thereby the sleeping surface upwardly toward a ceiling of the sleeping compartment to provide additional clearance between an under surface of the bed and a floor of the sleeping compartment; and
- tilting the bed downwardly away from the rear wall of the vehicle as the sleeping surface is raised upwardly toward the ceiling of the sleeping compartment.

29. A method according to claim 28 in which the positioning step comprises the steps of suspending the bed from the sleeping compartment with a plurality of elongated support elements and the raising step comprises the step of shortening the support elements to raise the bed.

30. A method according to claim 29 in which the step of shortening the support element comprises the step of winding flexible strap support elements about a common shaft to shorten the unwound portion of the support elements.

31. A method according to claim 29 in which the raising step comprises the step of raising one side portion of the bed faster than the opposite side portion of the bed such that the sleeping surface inclines as it is raised.

32. A method according to claim 28 in which the raising step comprises the step of inclining the bed forwardly from horizontal and thereby inclining the sleeping surface as the bed is raised.

* * * * *

UNITED STATES PATENT AND TRADEMARK OFFICE
CERTIFICATE OF CORRECTION

PATENT NO. : 5,984,404
DATED : November 16, 1999
INVENTOR(S) : Novoa et al.

It is certified that error appears in the above-identified patent and that said Letters Patent is hereby corrected as shown below:

Column 5,
Line 61, change "surface As" to -- surface. As --.

Column 6,
Line 42, change "horizontal In" to -- horizontal. In --
Line 63, change "106 Although" to -- 106. Although --

Column 7,
Line 27, change "gears 122" to -- gears 132 --

Column 10,
Line 58, change "(eog. by" to -- (e.g. by --

Column 11,
Lines 53-54, change "compartment As" to -- compartment. As --

Column 12,
Line 28, change "encountered" to -- encountered. --

Column 13,
Line 65, change "structure In addition," to -- structure. In addition, --

Column 14,
Line 53, change "rotabably" to -- rotatably --

Signed and Sealed this

Seventh Day of May, 2002

Attest:

JAMES E. ROGAN
*Attesting Officer*  *Director of the United States Patent and Trademark Office*